US008755260B2

(12) United States Patent
Oberg et al.

(10) Patent No.: US 8,755,260 B2
(45) Date of Patent: Jun. 17, 2014

(54) COLLIMATOR FOR OPTICAL PICK-UP UNITS

(75) Inventors: Mats Oberg, Cupertino, CA (US); Zachary Keirn, Boulder, CO (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/495,590

(22) Filed: Jun. 13, 2012

(65) Prior Publication Data

US 2013/0021890 A1 Jan. 24, 2013

Related U.S. Application Data

(60) Provisional application No. 61/509,016, filed on Jul. 18, 2011.

(51) Int. Cl.
*G11B 7/1374* (2012.01)
*G11B 7/1376* (2012.01)

(52) U.S. Cl.
USPC .................................................. 369/112.23

(58) Field of Classification Search
USPC ........... 369/44.29, 47.38, 94, 112.23, 112.03, 369/112.01
See application file for complete search history.

(56) References Cited

U.S. PATENT DOCUMENTS

| | | | |
|---|---|---|---|
| 2001/0026522 A1* | 10/2001 | Yanagawa | 369/94 |
| 2006/0171275 A1 | 8/2006 | Nishikawa | |
| 2008/0205249 A1* | 8/2008 | Bae et al. | 369/112.23 |
| 2009/0097383 A1 | 4/2009 | Yokota | |
| 2009/0122686 A1* | 5/2009 | Geurts | 369/112.23 |
| 2009/0252003 A1 | 10/2009 | Takahashi et al. | |
| 2010/0027405 A1* | 2/2010 | Nagatomi et al. | 369/112.23 |
| 2010/0188960 A1 | 7/2010 | Yasui | |
| 2010/0271925 A1* | 10/2010 | Yamasaki et al. | 369/112.03 |

FOREIGN PATENT DOCUMENTS

| | | |
|---|---|---|
| EP | 1 691 359 A2 | 8/2006 |
| EP | 1 865 504 A1 | 12/2007 |

OTHER PUBLICATIONS

International Search Report and Written Opinion issued Jul. 19, 2012 in International Patent Application No. PCT/US2012/042208.

* cited by examiner

*Primary Examiner* — Joseph Feild
*Assistant Examiner* — Andrew Sasinowski

(57) ABSTRACT

Aspects of the disclosure provide an apparatus. The apparatus includes a collimator configured to have a plurality of positions, and a controller configured to control the collimator to move to a predetermined position associated with a data layer of an optical storage medium to collimate a light beam. The collimated light beam is then focused onto the data layer of the optical storage medium.

18 Claims, 4 Drawing Sheets

COLLIMATOR FOR OPTICAL PICK-UP UNITS

RELATED CASES

This present disclosure claims the benefit of U.S. Provisional Application No. 61/509,016, "Discrete Level Collimator for Optical Pick-Up Units," filed on Jul. 18, 2011, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, an optical pickup unit (OPU) includes a collimator to collimate a light beam emitted from a light source. Further, the OPU includes an objective lens to focus the collimated light beam onto an optical disc.

SUMMARY

Aspects of the disclosure provide an apparatus. The apparatus includes a collimator configured to have a plurality of positions, and a controller configured to control the collimator to move to a first predetermined position associated with a first data layer of an optical storage medium to collimate a light beam. The collimated light beam is focused onto the first data layer of the optical storage medium.

Further, in an embodiment, the controller is configured to control the collimator to move to a second predetermined position associated with a second data layer of the optical storage medium to collimate the light beam. The collimated light beam is then focused onto the second data layer of the optical storage medium.

According to an aspect of the disclosure, the apparatus includes a collimator moving module configured to move the collimator to one of the plurality of positions responsive to a control signal from the controller. The collimator moving module includes at least one of memory metals, coils, and actuators.

In an embodiment, the first predetermined position associated with the first data layer of the optical storage medium is predetermined based on an error rate requirement, such as a bit-error-rate (BER) requirement.

Aspects of the disclosure provide a method. The method includes determining a target layer from a plurality of data layers of an optical storage medium, moving a collimator to a predetermined position associated with the target layer, adjusting an objective lens to focus the collimated light beam onto the target layer of the optical disc. In an example, the position is predetermined for the target layer to satisfy an error rate requirement. Further, the method includes storing a plurality of predetermined positions associated with the plurality of data layers.

Aspects of the disclosure provide another method. The method includes predetermining a plurality of collimator positions associated with a plurality of data layers of an optical storage medium to satisfy an error rate requirement, and enabling a collimator moving module to move a collimator to the plurality of predetermined collimator positions. In an example, the method includes characterizing a relationship of error rate and collimator position for each of the plurality of data layers, and predetermining the collimator positions associated with the data layers based on relationships of error rate with collimator position.

Aspects of the disclosure provide an electronic system. The electronic system includes an optical pick-up unit (OPU). The OPU includes a collimator configured to have a plurality of positions, and a controller configured to control the collimator to move to a predetermined position associated with a data layer of an optical storage medium to collimate a light beam. The OPU further includes an objective lens configured to focus the collimated light beam onto the data layer.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
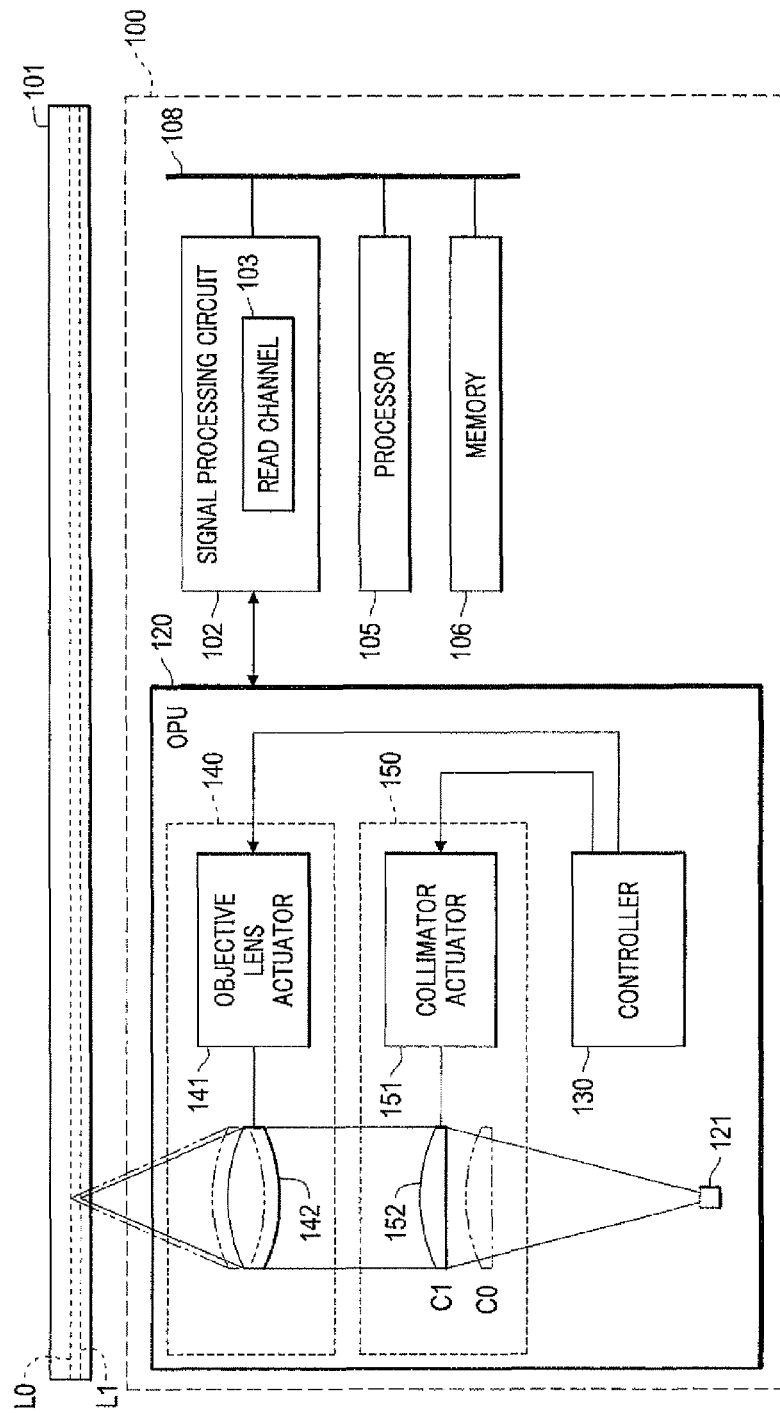
FIG. 1 shows an electronic system 100 according to an embodiment of the disclosure.

FIG. 1 shows an electronic system 100 and an optical storage medium 101 according to an embodiment of the disclosure. The electronic system 100 includes an optical pickup unit (OPU) 120 optically coupled with the optical storage medium 101 to operate on the optical storage medium 101. The OPU 120 includes a collimator 152 that is movable to a plurality of predetermined positions for collimating a light beam. The electronic system 100 includes other suitable components, such as a signal processing circuit 102, a processor 105, a solid-state memory 106, and the like. These elements are coupled together, for example, via a bus 108, as shown in FIG. 1.

According to an aspect of the disclosure, the optical storage medium 101 is a suitable disc, such as compact disc (CD), digital versatile disc (DVD), Blu-ray disc, and the like, that uses optical property changes to store information. In an embodiment, the optical storage medium 101 includes multiple data layers that are respectively used to store information. In the FIG. 1 example, the optical storage medium 101 includes two data layers, shown as a first layer L1 and a second layer L0, which are used to store information. The first layer L1 and the second layer L0 are stacked with other suitable layers, such as a cover layer from which optical beams enter the optical storage medium 101, a spacer layer between the first layer L1 and the second layer L0, a substrate layer, and the like, to form the optical storage medium 101. The thickness of the various layers may vary from disc to disc due to various variations during disc manufacturing, for example.

According to an aspect of the disclosure, the OPU 120 includes a light source 121, a collimator module 150, an objective lens module 140 and a controller 130. The light source 121 generates a suitable light beam, such as a laser beam and the like. The controller 130 provides control signals to the collimator module 150 to collimate the light beam and provides control signals to the objective lens module 140 to focus the collimated light beam onto a data layer of the optical storage medium 101, for example. It is noted that the OPU 120 also includes other suitable components (not shown), such as diffraction grating, light splitter, optical detector, and the like.

The collimator module 150 includes a collimator moving module configured to move the collimator 152. In the FIG. 1 example, the collimator module 150 includes a collimator actuator 151 coupled with the collimator 152. The collimator actuator 151 is configured to move the collimator 152 to one of a plurality of predetermined positions to suitably collimate the light beam. In an embodiment, a collimator position is predetermined in association with each data layer of a type of optical storage medium. In an example, a first collimator position C1 is predetermined in association with the first layer L1 of a type of the optical storage medium 101, and a second collimator position C0 is predetermined in association with the second layer L0 of the type of optical storage medium 101.

According to an aspect of the disclosure, because the collimator 152 only needs to be moved to the plurality of predetermined positions, the collimator actuator 151 can be implemented using a low cost actuator, such as memory metals, coils, and the like, to reduce a total cost of the electronic system 100. Generally, an OPU uses a stepper motor having fine steps to precisely adjust a collimator position to compensate for, for example, layer thickness variation, lens optical property variation due to temperature variation, and the like, in order to reduce spherical aberration. In an example, the OPU uses a feedback loop to control the stepper motor to precisely move a collimator to an optimal position. This type of stepper motor can be costly.

According to an aspect of the disclosure, precise collimator position adjustment may not be necessary in some electronic systems. In an example, the electronic system 100 is a playback system, and the signal processing circuit 102 is implemented to have a relatively high error correction capability. Thus, the electronic system 100 has a relatively high tolerance of spherical aberration, and may not need precise collimator position adjustment. Then, in an example, a low cost stepper motor, such as a stepper motor having coarse steps can be used to move the collimator 152 to one of the plurality of predetermined positions. In another example, a low cost actuator, such as memory metals, coils, and the like, is used in the place of the stepper motor to reduce system cost.

The objective lens module 140 includes an objective lens actuator 141 and an objective lens 142 coupled together. The objective lens actuator 141 adjusts the objective lens 142 to focus the light beam at an appropriate layer of the optical storage medium 101.

According to an aspect of the disclosure, the electronic system 100 is a playback system, and the OPU 120 is configured to generate an electrical signal responsive to information stored in the data layers of the optical storage medium 101. Specifically, when the light beam is directed to a data layer, the light beam is reflected from the data layer. The reflected light beam has light properties corresponding to the information stored in the data layer. The OPU 120 includes a detector (not shown) configured to detect the light properties, and generates an electrical signal corresponding to the light properties. The electrical signal is provided to the signal processing circuit 102. In an embodiment, the signal processing circuit 102 includes a read channel 103 to extract the information from the electrical signal.

The read channel 103 includes various circuits, such as analog circuits, digital circuits, and the like to process the received electrical signal. According to an aspect of the disclosure, the read channel 103 is configured to have an error tolerance. In an embodiment, when an error rate of the electrical signal is lower than a threshold (e.g., a bit-error-rate (BER) of the electrical signal is lower than a BER requirement), the read channel 103 can correctly extract the information from the electrical signal.

Further, according to an embodiment of the disclosure, the positions of the collimator 152 are predetermined such that the BER of the electrical signal is lower than the HER requirement. In an example, the position of the collimator 152 affects spherical aberration (SA) in the light beam. The spherical aberration then introduces bit errors. However, when the BER of the electrical signal is lower than the BER requirement, the read channel 103 performs appropriately, and can correct the errors.

The controller 130 is configured to provide control signals to the components in the OPU 120, such as the collimator module 150 and the objective lens module 140, and the like, to control the operations of the components, and coordinates the operations of the components. In an example, when the electronic system 100 decides to read the first layer L1 of the optical storage medium 101, the controller 130 sends control signals to the collimator actuator 151 to move the collimator 152 to the first position C1 and sends control signals to the objective lens actuator 141 to adjust the objective lens 142 to focus the collimated light beam on the first layer L1 of the optical storage medium 101. Similarly, when the electronic system 100 decides to read the second layer L0 of the optical storage medium 101, the controller 130 sends control signals to the collimator actuator 151 to move the collimator 152 to the second position C0, and sends control signals to the objective lens actuator 141 to adjust the objective lens 142 to focus the collimated light beam on the second layer L0 of the optical storage medium 101. The controller 120 can be implemented by any suitable hardware/software. In an example, the controller 130 is implemented using suitable circuits, such as logic circuits, memory circuits, and the like. In another example, the controller 130 is implemented as a processor executing software instructions.

Figure 2:
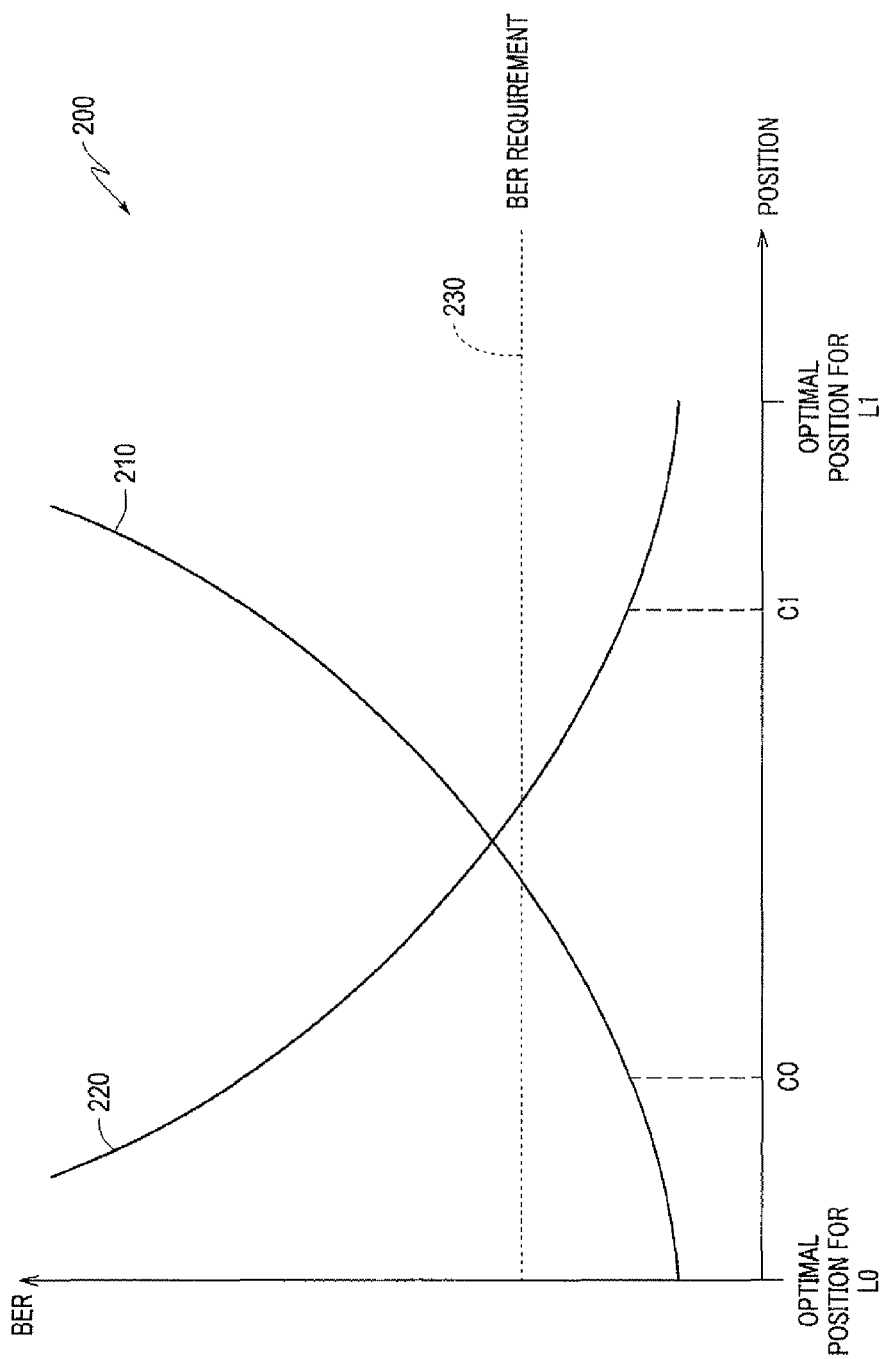
FIG. 2 shows a plot 200 of bit-error-rate (BER) characteristics with regard to the collimator position.

FIG. 2 shows a plot 200 of bit-error-rate (BER) characteristics according to an embodiment of the disclosure. X-axis is the position of the collimator 152, and Y-axis is the BER of the electrical signal. The plot 200 includes a first curve 220 and a second curve 210. The first curve 220 shows a first BER characteristic corresponding to reading data from the first layer L1, and the second curve 210 shows a second BER characteristic corresponding to reading data from the second layer L0.

As shown by the first curve 220, when the collimator 152 is at an optimal position for the first layer L1 that is optimized for reading data from the first layer L1, the electrical signal has the lowest BER. When the position shifts from the optimal position for the first layer L1, the BER of the electrical signal increases.

Similarly, when the collimator 152 is at an optimal position for the second layer L0 that is optimized for reading data from the second layer L0, the electrical signal has the lowest BER. When the position shifts from the optimal position for the second layer L0, the BER of the electrical signal increases.

According to an embodiment of the disclosure, the BER characteristics are used to predetermine a plurality of positions for the collimator 152. In an example, during manufacturing of the electronic system 100, the BER characteristics are suitably determined. Further, a BER requirement, such as the BER requirement 230, for the read channel 103 is determined. Based on the BER requirement, collimator positions in association with the data layers are determined.

In the FIG. 2 example, collimator position C1 is selected for the first layer L1 such that the BER of electrical signal generated responsive to reading from the first layer L1 is lower than the BER requirement 230, and collimator position C0 is selected for the second layer L0 such that the BER of the electrical signal generated responsive to reading from the second layer L0 is lower than the BER requirement 230.

Then, the electronic system 100 is suitably manufactured according to the determined collimator positions C1 and C0. For example, the collimator actuator 151 is then configured to be able to move the collimator 152 to the collimator positions C1 and C0, and the controller 130 is configured to store control parameters that enable the operation of the collimator module 150, and enable the coordination of the collimator module 150 with the other components of the OPU 120.

It is noted that the collimator positions may need to satisfy other suitable requirement. In an example, the collimator positions C1 and C0 are selected such that the BERs of the electrical signal have suitable margins to the BER requirement 230.

Figure 3:
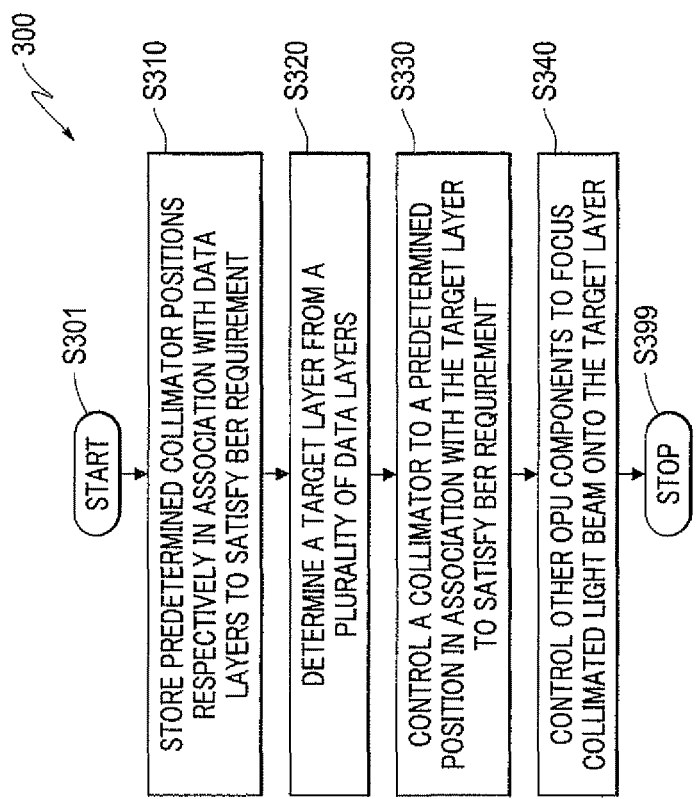
FIG. 3 shows a flow chart outlining a process example 300 according to an embodiment of the disclosure.

FIG. 3 shows a flow chart outlining a process example 300 for the electronic system 100 according to an embodiment of the disclosure. In an example, the electronic system 100 is a playback system that reads data stored on the multiple data layers of the optical storage medium 101, and operates based on the data. The process starts at S301 and proceeds to S310.

At S310, the controller 130 stores predetermined collimator positions in association with respective data layers. The collimator positions are pre-determined to ensure electrical signals generated from reading the respective data layers satisfy a BER requirement.

At S320, the controller 130 determines a target layer from a plurality of data layers. In an example, the controller 130 receives signals indicative of the target layer from other components, such as the processor 105 of the electronic system 100.

At S330, the controller 130 provides control signals to the collimator actuator 151 to move the collimator 152 to a predetermined position in association with the target layer. In an example, based on the stored information and the target layer, the controller 130 determines the collimator position such that the electrical signal generated from reading the target layer satisfies the BER requirement. Then, the controller 130 provides the control signals to move the collimator 152 to the determined collimator position.

At S340, the controller 130 controls other OPU components to collectively focus a light beam onto the target layer to read the data stored on the target layer. In an example, the controller 130 controls the light source 121 to suitably emit a light beam. The light beam is collimated through the collimator 152. Then, the controller 130 controls the objective lens module 140 to focus the collimated light beam onto the target layer. The controller 130 can also control a detector to detect reflected light beam and to generate an electrical signal responsive to the reflected light beam. The electrical signal is then provided to the signal processing circuit 102 for further processing. Then the process proceeds to S399 and terminates.

It is noted that the process 300 can be suitably adjusted. In an example, the controller 130 provides the control signals to the collimator actuator 151 and the other OPU components at about the same time.

Figure 4:
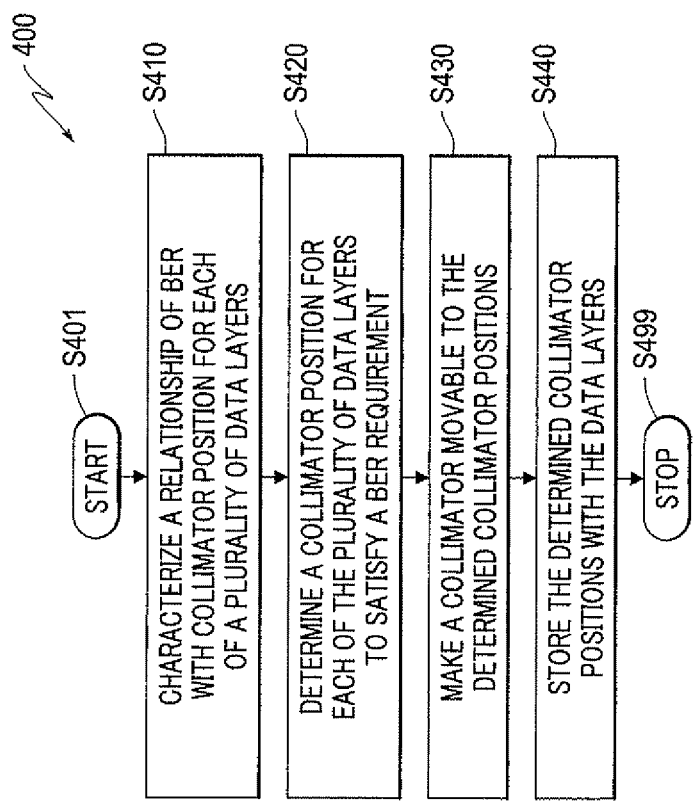
FIG. 4 shows a flow chart outlining a process example 400 according to an embodiment of the disclosure.

FIG. 4 shows a flow chart outlining a process example 400 according to an embodiment of the disclosure. In an example, the process 400 is performed during manufacturing of an electronic system 100. The process starts at S401, and proceeds to S410.

At S410, a relationship is determined between electrical signal BER and collimator position for each of a plurality of data layers in an optical storage medium 101, such as the first curve 220 and the second curve 210 in FIG. 2.

At S420, a collimator position is determined for each of the plurality of data layers, such that an electrical signal generated responsive to reading information from the data layer satisfies a BER requirement. In an example, the BER requirement is determined based on error correction capability of a signal processing circuit. Then, based on the BER requirement and the relationship of BER with collimator position for a data layer, the collimator position for the data layer is determined.

At S430, a collimator of an electronic system is made movable to the determined collimator positions. In an example, a collimator actuator is configured to be able to move the collimator to the determined collimator positions.

At S440, the determined collimator positions are stored in association with the data layers in the electronic system 100, such as in a controller 130. Then, the process proceeds to S499 and terminates.

It is noted that the process 400 can be suitably adjusted. In an example, the process 400 includes additional alternations to assemble various components of the electronic system 100 together.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
    a collimator configured to be moved between a plurality of predetermined discrete positions corresponding to a plurality of data layers of an optical storage medium, the discrete positions being determined without reference to a current optical storage medium being read; and
    a controller configured to control the collimator to move between only the discrete positions to collimate a light beam, the collimated light beam being focused onto the corresponding date layer of the optical storage medium.

2. The apparatus of claim 1, further comprising:
    an objective lens configured to focus the collimated light beam onto the data layer of the current optical storage medium.

3. The apparatus of claim 1, further comprising:
    a collimator moving module configured to move the collimator to one of the plurality of positions responsive to a control signal from the controller.

4. The apparatus of claim 3, wherein the collimator moving module includes at least one of memory metals, coils, and actuators.

5. The apparatus of claim 4, wherein the collimator moving module is not a stepper motor.

6. The apparatus of claim 1, wherein the predetermined discrete position associated with the data layer of the optical storage medium is predetermined based on an error rate requirement.

7. The apparatus of claim 1, wherein the controller stores the discrete predetermined position associated with the data layer of the optical storage medium.

8. A method, comprising:
    determining a target layer from a plurality of data layers of an optical storage medium;
    moving a collimator to a predetermined position associated with the target layer; and adjusting an objective lens to focus the collimated light beam onto the target layer of the optical disc;
wherein the predetermined position is one of two movable positions of the collimator that are determined without reference to a current optical storage medium being read.

9. The method of claim 8, wherein moving the collimator to the predetermined position associated with the target layer further comprises:
moving the collimator to the predetermined position that is predetermined for the target layer to satisfy an error rate requirement.

10. The method of claim 8, further comprising:
storing a plurality of predetermined positions associated with the plurality of data layers.

11. The method of claim 8, wherein moving the collimator to the predetermined position associated with the target layer further comprises:
controlling at least one of memory metals, coils, and actuators to move the collimator.

12. A method, comprising:
predetermining a plurality of collimator positions associated with a plurality of data layers of an optical storage medium to satisfy an error rate requirement;
enabling a collimator moving module to move a collimator to the plurality of predetermined collimator positions; and
focusing a collimated light beam of the collimator onto a layer of the plurality of data layers of the optical storage medium;
wherein the collimator is configured to be only movable to the plurality of predetermined collimator positions associated with the plurality of data layers that are determined without reference to a current optical storage medium being read.

13. The method of claim 12, further comprising:
characterizing a relationship of error rate and collimator position for each of the plurality of data layers; and
determining the collimator positions in association with the data layers based on relationships of error rate with collimator position.

14. The method of claim 12, further comprising:
storing the predetermined collimator positions associated with the data layers in a controller that controls the collimator moving module.

15. An electronic system, comprising:
an optical pick-up unit (OPU) that includes
a collimator configured to have a plurality of predetermined discrete positions; and
a controller configured to control the collimator to move between the discrete positions to collimate a light beam, the collimated light beam being focused onto the data layer of the optical storage medium,
wherein the collimator is configured to be only movable to the predetermined position associated with the data layer that are determined without reference to the optical storage medium being read.

16. The electronic system of claim 15, wherein the OPU further comprises:
a collimator moving module configured to move the collimator to one of the plurality of positions responsive to a control signal from the controller.

17. The electronic system of claim 15, wherein the predetermined position associated with the data layer of the optical storage medium is predetermined based on an error rate requirement.

18. The electronic system of claim 15, wherein the collimator moving module includes at least one of memory metals, coils, and actuators.

* * * * *